(12) United States Patent
Nair et al.

(10) Patent No.: US 8,832,246 B2
(45) Date of Patent: Sep. 9, 2014

(54) SERVICE LEVEL MAPPING METHOD (75) Inventors: Manoj Nair, Cary, NC (US); Stephen R Perrin, Chapel Hill, NC (US); Iva Blazina Vukelja, Everett, MA (US); John Philip Bell, II, Skibbereen (IE); Alex Rankov, Danville, CA (US)

(73) Assignee: EMC Corporation, Hopkinton, MA (US)

( * ) Notice: Subject to any disclaimer, the term of this patent is extended or adjusted under 35 U.S.C. 154(b) by 1084 days.

(21) Appl. No.: 11/528,790

(22) Filed: Sep. 27, 2006

(65) Prior Publication Data

US 2008/0077682 A1 Mar. 27, 2008

Related U.S. Application Data (60) Provisional application No. 60/826,072, filed on Sep. 18, 2006, provisional application No. 60/826,073, (Continued)

(51) Int. Cl.
*G06F 15/173* (2006.01)
*H04L 12/24* (2006.01)
*G06F 17/30* (2006.01)
*H04L 29/08* (2006.01)

(52) U.S. Cl.
CPC .......... *G06F 17/30598* (2013.01); *H04L 41/12* (2013.01); *G06F 17/30115* (2013.01); *H04L 41/5003* (2013.01); *H04L 41/5009* (2013.01); *H04L 67/16* (2013.01); *Y10S 707/99931* (2013.01); *Y10S 707/99942* (2013.01)
USPC ........... 709/223; 709/217; 709/218; 709/219; 709/220; 709/221; 709/222; 709/224; 709/225; 709/226; 709/227; 709/228; 709/229; 709/230; 707/694; 707/999.001; 707/999.101; 707/E17.001; 707/E17.005; 718/104

(58) Field of Classification Search
CPC ..... H04L 41/12; H04L 41/50; H04L 41/5003; H04L 41/5009; H04L 41/5019; H04L 67/16; H04L 29/08; H04L 29/08081; H04L 29/08648; G06F 17/30; G06F 17/30115; G06F 17/30598
USPC ......... 709/223, 206, 226, 217, 218, 219, 220, 709/221, 222, 224, 225, 227, 228, 229, 709/230; 707/694, 999.001, 999.101, 707/E17.001, E17.005; 718/104
IPC ............. H04L 41/12, 41/50, 41/5003, 41/5009, H04L 41/5019, 67/16, 29/30, 29/30115, 29/30598; G06F 17/08, 17/08081, 17/08648
See application file for complete search history.

(56) References Cited

U.S. PATENT DOCUMENTS 6,003,040 A 12/1999 Mital et al.
(Continued)

FOREIGN PATENT DOCUMENTS

EP 1855218 A2 11/2007
WO WO 2008/036621 3/2008

OTHER PUBLICATIONS

U.S. Appl. No. 11/692,051, filed Mar. 27, 2007, Perrin et al.
(Continued)

*Primary Examiner* — Saket K Daftuar
(74) *Attorney, Agent, or Firm* — Workman Nydegger (57) ABSTRACT

A method and system for assigning service level objectives to data objects stored within a computer system. The computer system includes an information management server for providing customized services to data objects residing in the computer system. One exemplary method identifies a data object, such as a file, folder, database, and the like, that has been categorized according to at least one property associated with the data object. The method also identifies service level objectives that are available within the computer system. Service level objectives may include any type of service area or service level that can be provided to a data object. The data object is then associated with one or more of the service level objectives for requesting that the services associated with the one or more service level objectives be provided to the data object.

24 Claims, 7 Drawing Sheets

Related U.S. Application Data filed on Sep. 18, 2006, provisional application No. 60/826,053, filed on Sep. 18, 2006, provisional application No. 60/826,074, filed on Sep. 18, 2006, provisional application No. 60/826,042, filed on Sep. 18, 2006.

(56) References Cited

U.S. PATENT DOCUMENTS

| | | |
|---|---|---|
| 6,167,445 A | 12/2000 | Gai et al. |
| 6,308,216 B1 | 10/2001 | Goldszmidt et al. |
| 6,349,297 B1 | 2/2002 | Shaw et al. |
| 6,363,053 B1* | 3/2002 | Schuster et al. ............. 370/230 |
| 6,430,613 B1 | 8/2002 | Brunet et al. |
| 6,591,300 B1 | 7/2003 | Yurkovic |
| 6,633,312 B1 | 10/2003 | Rochford et al. |
| 6,865,728 B1 | 3/2005 | Branson et al. |
| 7,185,073 B1 | 2/2007 | Gai et al. |
| 7,240,076 B2 | 7/2007 | McCauley et al. |
| 7,278,156 B2* | 10/2007 | Mei et al. ......................... 726/11 |
| 7,363,292 B2 | 4/2008 | Chaboche |
| 7,433,304 B1 | 10/2008 | Galloway et al. |
| 7,543,020 B2* | 6/2009 | Walker et al. ................ 709/203 |
| 7,548,915 B2 | 6/2009 | Ramer et al. |
| 7,565,324 B2 | 7/2009 | Vincent |
| 7,580,357 B2* | 8/2009 | Chang et al. .................. 370/235 |
| 7,613,806 B2 | 11/2009 | Wright et al. |
| 7,616,642 B2* | 11/2009 | Anke et al. .............. 370/395.42 |
| 7,725,570 B1* | 5/2010 | Lewis ........................... 709/224 |
| 7,725,571 B1* | 5/2010 | Lewis ........................... 709/224 |
| 7,730,172 B1* | 6/2010 | Lewis ........................... 709/224 |
| 7,734,765 B2* | 6/2010 | Musman et al. ............. 709/224 |
| 7,895,220 B2 | 2/2011 | Evans et al. |
| 7,953,740 B1 | 5/2011 | Vadon et al. |
| 8,069,435 B1 | 11/2011 | Lai |
| 8,104,080 B2 | 1/2012 | Burns et al. |
| 2002/0016800 A1 | 2/2002 | Spivak et al. |
| 2002/0091746 A1* | 7/2002 | Umberger et al. ............ 709/105 |
| 2002/0120685 A1 | 8/2002 | Srivastava et al. |
| 2002/0161883 A1 | 10/2002 | Matheny et al. |
| 2003/0023587 A1 | 1/2003 | Dennis et al. |
| 2003/0023712 A1 | 1/2003 | Zhao et al. |
| 2003/0036886 A1* | 2/2003 | Stone .............................. 702/188 |
| 2003/0041050 A1 | 2/2003 | Smith et al. |
| 2003/0093528 A1 | 5/2003 | Rolia |
| 2003/0140009 A1 | 7/2003 | Namba et al. |
| 2003/0167180 A1* | 9/2003 | Chung et al. ...................... 705/1 |
| 2003/0196108 A1 | 10/2003 | Kung |
| 2003/0212778 A1* | 11/2003 | Collomb ........................ 709/223 |
| 2003/0225829 A1 | 12/2003 | Pena et al. |
| 2003/0233391 A1 | 12/2003 | Crawford et al. |
| 2003/0233464 A1* | 12/2003 | Walpole et al. ............... 709/231 |
| 2003/0236904 A1* | 12/2003 | Walpole et al. ............... 709/231 |
| 2004/0060002 A1 | 3/2004 | Lucovsky et al. |
| 2004/0098415 A1 | 5/2004 | Bone et al. |
| 2004/0215650 A1 | 10/2004 | Shaji et al. |
| 2004/0236660 A1 | 11/2004 | Thomas et al. |
| 2004/0243699 A1 | 12/2004 | Koclanes et al. |
| 2005/0060662 A1 | 3/2005 | Soares et al. |
| 2005/0071182 A1* | 3/2005 | Aikens et al. ..................... 705/1 |
| 2005/0102297 A1 | 5/2005 | Lloyd et al. |
| 2005/0125768 A1 | 6/2005 | Wong et al. |
| 2005/0131982 A1* | 6/2005 | Yamasaki et al. ............. 709/200 |
| 2005/0132034 A1 | 6/2005 | Iglesia et al. |
| 2005/0177545 A1* | 8/2005 | Buco et al. ........................ 707/1 |
| 2005/0197852 A1 | 9/2005 | Gebhard et al. |
| 2005/0251533 A1 | 11/2005 | Harken et al. |
| 2005/0262097 A1 | 11/2005 | Sim-Tang et al. |
| 2005/0273451 A1* | 12/2005 | Clark et al. ........................ 707/1 |
| 2005/0289216 A1 | 12/2005 | Myka et al. |
| 2006/0015388 A1 | 1/2006 | Flockhart et al. |
| 2006/0036463 A1 | 2/2006 | Patrick et al. |
| 2006/0039364 A1 | 2/2006 | Wright |
| 2006/0092861 A1 | 5/2006 | Corday et al. |
| 2006/0095543 A1 | 5/2006 | Ito et al. |
| 2006/0095570 A1 | 5/2006 | O'Sullivan |
| 2006/0101084 A1 | 5/2006 | Kishi et al. |
| 2006/0106782 A1 | 5/2006 | Blumenau et al. |
| 2006/0112108 A1 | 5/2006 | Eklund et al. |
| 2006/0114832 A1* | 6/2006 | Hamilton et al. ............. 370/244 |
| 2006/0129974 A1 | 6/2006 | Brendle et al. |
| 2006/0179143 A1* | 8/2006 | Walker et al. ................ 709/226 |
| 2006/0236061 A1* | 10/2006 | Koclanes ...................... 711/170 |
| 2006/0248165 A1* | 11/2006 | Sridhar et al. ................ 709/218 |
| 2006/0248187 A1 | 11/2006 | Thorpe et al. |
| 2007/0038683 A1 | 2/2007 | Dixon et al. |
| 2007/0055689 A1 | 3/2007 | Rhoads et al. |
| 2007/0058632 A1 | 3/2007 | Back et al. |
| 2007/0061363 A1 | 3/2007 | Ramer et al. |
| 2007/0070894 A1* | 3/2007 | Wang et al. .................. 370/230 |
| 2007/0083875 A1 | 4/2007 | Jennings |
| 2007/0103984 A1 | 5/2007 | Kavuri et al. |
| 2007/0104208 A1* | 5/2007 | Svensson ...................... 370/412 |
| 2007/0127370 A1* | 6/2007 | Chang et al. ................. 370/229 |
| 2007/0153802 A1* | 7/2007 | Anke et al. .............. 370/395.42 |
| 2007/0162749 A1 | 7/2007 | Lim |
| 2007/0192352 A1 | 8/2007 | Levy |
| 2007/0208751 A1 | 9/2007 | Cowan et al. |
| 2007/0214208 A1 | 9/2007 | Balachandran |
| 2007/0226228 A1* | 9/2007 | Her et al. ......................... 707/10 |
| 2007/0260640 A1 | 11/2007 | Hamilton et al. |
| 2007/0294406 A1* | 12/2007 | Suer et al. ..................... 709/226 |
| 2007/0299828 A1 | 12/2007 | Lewis et al. |
| 2008/0002678 A1* | 1/2008 | Klessig et al. ................ 370/389 |
| 2008/0005086 A1 | 1/2008 | Moore |
| 2008/0021850 A1 | 1/2008 | Irle et al. |
| 2008/0049642 A1 | 2/2008 | Gudipudi et al. |
| 2008/0059387 A1 | 3/2008 | Vaidhyanathan et al. |
| 2008/0071726 A1 | 3/2008 | Nair et al. |
| 2008/0071727 A1 | 3/2008 | Nair et al. |
| 2008/0071813 A1 | 3/2008 | Nair et al. |
| 2008/0071908 A1 | 3/2008 | Nair et al. |
| 2008/0077995 A1 | 3/2008 | Curnyn et al. |
| 2008/0097923 A1 | 4/2008 | Kim et al. |
| 2008/0114725 A1 | 5/2008 | Indeck et al. |
| 2008/0134043 A1 | 6/2008 | Georgis et al. |
| 2008/0177994 A1 | 7/2008 | Mayer |
| 2008/0301760 A1 | 12/2008 | Lim |
| 2009/0077210 A1* | 3/2009 | Musman et al. .............. 709/223 |
| 2009/0150431 A1 | 6/2009 | Schmidt et al. |
| 2009/0157881 A1 | 6/2009 | Kavuri et al. |
| 2010/0250497 A1 | 9/2010 | Redich et al. |
| 2013/0110840 A1 | 5/2013 | Nair et al. |

OTHER PUBLICATIONS

U.S. Appl. No. 11/692,058, filed Mar. 27, 2007, Perrin et al.
U.S. Appl. No. 11/694,753, filed Mar. 30, 2007, Nair et al.
U.S. Appl. No. 11/694,764, filed Mar. 30, 2007, Nair et al.
U.S. Appl. No. 11/694,783, filed Mar. 30, 2007, Perrin et al.
U.S. Appl. No. 11/772,179, filed Jun. 30, 2007, John Philip Bell, II.
U.S. Appl. No. 11/772,192, filed Jun. 30, 2007, Nair et al.
U.S. Appl. No. 11/528,900, Jun. 9, 2008, Office Action.
U.S. Appl. No. 11/528,772, Sep. 12, 2008, Pre-Interview First Office Action.
U.S. Appl. No. 11/528,783, Nov. 7, 2008, Pre-Interview First Office Action.
U.S. Appl. No. 11/528,898, Sep. 5, 2008, Pre-Interview First Office Action.
U.S. Appl. No. 11/528,783, Feb. 24, 2009, Office Action.
U.S. Appl. No. 11/528,898, Feb. 9, 2009, First Action Interview.
U.S. Appl. No. 11/528,898, Apr. 3, 2009, Office Action.
U.S. Appl. No. 11/528,900, Jan. 23, 2009, First Office Action.
U.S. Appl. No. 11/694,753, Mar. 25, 2009, Office Action.
U.S. Appl. No. 11/694,783, Feb. 6, 2009, Office Action.
U.S. Appl. No. 11/528,772, Jun. 3, 2009, Final Office Action.
U.S. Appl. No. 11/528,783, Jun. 25, 2009, Final Office Action.
U.S. Appl. No. 11/528,900, Aug. 25, 2009, Notice of Allowance.
U.S. Appl. No. 11/692,058, Jul. 9, 2009, Office Action.
U.S. Appl. No. 11/692,051, Aug. 26, 2009, Office Action.
U.S. Appl. No. 11/772,179, Aug. 19, 2009, Office Action.
U.S. Appl. No. 11/528,898, Oct. 7, 2009, Final Office Action.

(56) References Cited

OTHER PUBLICATIONS

U.S. Appl. No. 11/694,753, Nov. 18, 2009, Final Office Action.
U.S. Appl. No. 11/864,596, filed Sep. 28, 2007, Nair et al.
U.S. Appl. No. 11/864,605, filed Sep. 28, 2007, Nair et al.
U.S. Appl. No. 11/864,770, filed Sep. 28, 2007, Nair et al.
U.S. Appl. No. 11/864,774, filed Sep. 28, 2007, Nair et al.
U.S. Appl. No. 11/864,760, filed Sep. 28, 2007, Nair et al.
U.S. Appl. No. 11/864,764, filed Sep. 28, 2007, Nair et al.
U.S. Appl. No. 11/528,783, Jan. 15, 2010, Office Action.
U.S. Appl. No. 11/692,058, Jan. 8, 2010, Final Office Action.
U.S. Appl. No. 11/864,596, Nov. 12, 2009, Office Action.
U.S. Appl. No. 11/864,770, Nov. 27, 2009, Office Action.
U.S. Appl. No. 11/864,760, Nov. 24, 2009, Office Action.
U.S. Appl. No. 11/864,605, Jan. 14, 2010, Office Action.
U.S. Appl. No. 11/528,772, Jan. 28, 2010, Office Action.
U.S. Appl. No. 11/694,753, Mar. 29, 2010, Office Action.
U.S. Appl. No. 11/692,051, Feb. 19, 2010, Notice of Allowance.
U.S. Appl. No. 11/692,051, Mar. 31, 2010, Notice of Allowance.
U.S. Appl. No. 11/694,764, Jan. 28, 2010, Office Action.
U.S. Appl. No. 11/772,179, Feb. 23, 2010, Final Office Action.
U.S. Appl. No. 11/864,770, Apr. 21, 2010, Final Office Action.
U.S. Appl. No. 11/772,192, Apr. 15, 2010, Office Action.
U.S. Appl. No. 11/864,760, Apr. 7, 2010, Final Office Action.
U.S. Appl. No. 11/528,772, Aug. 10, 2010, Final Office Action.
U.S. Appl. No. 11/528,783, Sep. 1, 2010, Final Office Action.
U.S. Appl. No. 11/692,058, Jul. 6, 2010, Office Action.
U.S. Appl. No. 11/694,753, Oct. 5, 2010, Final Office Action.
U.S. Appl. No. 11/694,764, Aug. 4, 2010, Final Office Action.
U.S. Appl. No. 11/772,192, Oct. 29, 2010, Final Office Action.
U.S. Appl. No. 11/864,596, May 26, 2010, Final Office Action.
U.S. Appl. No. 11/864,605, May 28, 2010, Final Office Action.
U.S. Appl. No. 11/864,605, Nov. 4, 2010, Office Action.
U.S. Appl. No. 11/864,760, Jul. 27, 2010, Office Action.
U.S. Appl. No. 11/864,770, Nov. 3, 2010, Office Action.
U.S. Appl. No. 11/694,753, Jun. 17, 2011, Final Office Action.
U.S. Appl. No. 11/528,772, Mar. 3, 2011, Office Action.
U.S. Appl. No. 11/692,058, Jan. 24, 2011, Notice of Allowance.
U.S. Appl. No. 11/694,753, Jan. 19, 2011, Office Action.
U.S. Appl. No. 11/694,764, Mar. 17, 2011, Office Action.
U.S. Appl. No. 11/864,596, Mar. 11, 2011, Office Action.
U.S. Appl. No. 11/864,605, Mar. 9, 2011, Final Office Action.
U.S. Appl. No. 11/864,760, Jan. 27, 2011, Final Office Action.
U.S. Appl. No. 11/864,770, Apr. 19, 2011, Final Office Action.
U.S. Appl. No. 11/864,764, Jan. 27, 2011, Office Action.
U.S. Appl. No. 11/864,774, May 11, 2011, Office Action.
U.S. Appl. No. 13/414,512, filed Mar. 7, 2012, Nair et al.
U.S. Appl. No. 11/528,772, Oct. 27, 2011, Notice of Allowance.
U.S. Appl. No. 11/528,783, Feb. 14, 2012, Office Action.
U.S. Appl. No. 11/528,898, Mar. 1, 2012, Office Action.
U.S. Appl. No. 11/694,753, Jan. 26, 2012, Office Action.
U.S. Appl. No. 11/694,764, Sep. 26, 2011, Final Office Action.
U.S. Appl. No. 11/772,179, Mar. 29, 2012, Office Action.
U.S. Appl. No. 11/772,192, Jan. 5, 2012, Office Action.
U.S. Appl. No. 11/864,596, Oct. 7, 2011, Final Office Action.
U.S. Appl. No. 11/864,764, Aug. 29, 2011, Final Office Action.
U.S. Appl. No. 11/864,764, May 3, 2012, Office Action.
U.S. Appl. No. 11/864,774, Dec. 9, 2011, Final Office Action.
U.S. Appl. No. 11/528,783, Aug. 15, 2012, Final Office Action.
U.S. Appl. No. 11/528,898, Oct. 2, 2012, Final Office Action.
U.S. Appl. No. 11/694,753, Aug. 31, 2012, Notice of Allowance.
U.S. Appl. No. 11/694,764, Aug. 1, 2012, Office Action.
U.S. Appl. No. 11/772,179, Nov. 13, 2012, Final Office Action.
U.S. Appl. No. 11/772,192, Jun. 12, 2012, Final Office Action.
U.S. Appl. No. 11/864,605, Jul. 3, 2012, Office Action.
U.S. Appl. No. 11/864,605, Nov. 8, 2012, Final Office Action.
U.S. Appl. No. 11/694,764, Nov. 29, 2012, Final Office Action.
U.S. Appl. No. 11/864,770, Feb. 4, 2013, Office Action.
U.S. Appl. No. 11/864,764, Dec. 10, 2012, Final Office Action.
Office Action dated Oct. 11, 2013 from U.S. Appl. No. 11/772,179, filed Jun. 30, 2007.
Ben-Ghorbel-Talbi et al.; "An Extended Role-Based Access Control Model for Delegating Obligations"; Springer-Verlag Berline Heidelberg 2009.
Belokosztolszki et al.; "Meta-Policies for Distributed Role-Based Access Control Systems"; 2002 IEEE.
U.S. Appl. No. 11/694,764, May 21, 2013, Notice of Allowance.
U.S. Appl. No. 11/772,192, Aug. 12, 2013, Notice of Allowance.
U.S. Appl. No. 11/864,605, May 24, 2013, Notice of Allowance.
U.S. Appl. No. 11/864,770, Jun. 13, 2013, Final Office Action.
U.S. Appl. No. 13/414,512, Aug. 1, 2013, Office Action.
U.S. Appl. No. 11/864,770, Nov. 26, 2013, Office Action.
U.S. Appl. No. 11/864,764, Nov. 20, 2013, Office Action.
U.S. Appl. No. 11/864,774, Apr. 15, 2013, Notice of Allowance.
U.S. Appl. No. 13/414,512, Mar. 14, 2014, Final Office Action.
U.S. Appl. No. 13/719,084, Jul. 26, 2013, Office Action.
U.S. Appl. No. 13/719,084, Jan. 6, 2014, Notice of Allowance.
U.S. Appl. No. 13/972,089, filed Aug. 21, 2013, Nair et al.
Gasser et al., "An Architecture for Practical Delegation in a Distributed System", 1990 IEEE Computer Society Symposium, May 7-9, 1990, pp. 20-30.
U.S. Appl. No. 13/972,089, Mailing date Apr. 16, 2014, Notice of Allowance.

* cited by examiner

SERVICE LEVEL MAPPING METHOD

CROSS-REFERENCE TO RELATED APPLICATIONS

This application claims the benefit of:

U.S. Provisional Application Ser. No. 60/826,072, filed Sep. 18, 2006 and entitled "INFORMATION MANAGEMENT";

U.S. Provisional Application Ser. No. 60/826,073, filed Sep. 18, 2006 and entitled "CASCADED DISCOVERY OF INFORMATION ENVIRONMENT";

U.S. Provisional Application Ser. No. 60/826,053, filed Sep. 18, 2006, entitled "ENVIRONMENT CLASSIFICATION";

U.S. Provisional Application Ser. No. 60/826,074, filed Sep. 18, 2006 and entitled "INFORMATION CLASSIFICATION"; and U.S. Provisional Application No. 60/826,042, filed Sep. 18, 2006, entitled "SERVICE LEVEL MAPPING METHOD";

which applications are incorporated herein by reference in their entirety.

BACKGROUND

1. The Field of the Invention

The present invention relates generally to information management services. More specifically, the present invention relates to methods and systems for mapping data objects within a computer system to service level objectives and to service providers that are capable of providing those services.

2. The Relevant Technology

Modern computer systems allow for the interchange of data and resources through network environments. For example, a modern computer network may include a number of interconnected client computers. The computer network may further include resources. Such resources may be, for example and not limited to, file servers for storing data accessible by the clients, print servers for providing access to printers to the clients, and shared stores on client computers for storing data to be made available to other clients and resources on the network.

In this society where many personal and business interactions are data driven, the ability to provide protection, retention, recovery, security, and other services to data have become important features of computer networks. Establishing a system to provide these services can be costly, both in terms of the equipment and applications necessary to perform the services and particularly in terms of the time required to configure and manage the system. As the amount of data stored by a system increases and the storage systems become more complex, the ability to customize the services provided to each data file is of greater importance.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention relate to methods and systems for assigning service level objectives to data objects stored within a computer system. The computer system includes an information management server for providing customized services to data objects residing in the computer system. One exemplary method identifies a data object, such as a file, folder, database, and the like, that has been categorized according to at least one property associated with the data object. The method also identifies service level objectives that may be requested by the data objects. Service level objectives may include any type of service area, service level, or information management actions that can be provided to a data object, including data backup, data retention, data indexing, lifecycle management, and the like, as is described in further detail herein. The data object is then associated with one or more of the service level objectives for requesting that one or more services be provided to the data object.

In an alternative embodiment, the data objects are further assigned to one or more service packages that are capable of providing the services level objectives requested by each data object.

As used herein, the terms "data" and "data object" may include, but are not limited to, files, directories (e.g., volumes, file systems, and the like), user data, system data, applications, services, operating systems, instructions, and the like, that can be stored on one or more storage devices. Backing up or recovering the data may include backing up or recovering any of the data herein defined or understood by those of skill in the art. Data may be organized in logical directories that do not necessarily correspond to a particular storage device. The term "directory" can be used interchangeably with the term "volume" or "file system" to refer to any means of logically organizing data on a computer.

Certain embodiments described herein will involve electronic communication between a client computer system (hereinafter referred to as a "client") requesting access to a network service at a server computer system (hereinafter referred to as a "server"). Accordingly, the client sends a request to the server for particular access to its system resources, wherein if the client is authorized and validated, the server responds with a response message providing the desired information. Of course, other messaging patterns between client and server are available, as are well known in the art.

It should be appreciated that the present invention can be implemented in numerous ways, including as a process, an apparatus, a system, a device, a method, or a computer-readable medium such as a computer-readable storage medium or a computer network wherein program instructions are sent over optical or electronic communication links. A general purpose computer system such as an Intel-based processor running Microsoft Windows or Linux may be used, or a specialized appliance may be used.

1. Introduction to Information Management Services

Embodiments of the invention relate to information or data management. Information management enables the orchestration of services such as data protection, data placement, corporate compliance, and others based on the needs of the underlying data and the value of the data to the owner of the data. Embodiments of the invention enable the data to be classified in an automated fashion and provides various levels of granularity that can be adjusted as needed. Using the techniques described herein, an entity can be assured that its data is receiving the services that are actually required. The following introduction provides context for the present invention, which focuses on service level mapping used for facilitating the orchestration of customized service levels.

Information management is scalable and can be implemented in a variety of different computer or computing systems. A computer system, by way of example only, may refer to a single computer, to multiple computers (including clients and/or server computers, and other devices) that are connected with a network. The objects of a computer system can include servers, applications, services, data, file, and the like or any combination thereof.

Figure 1:
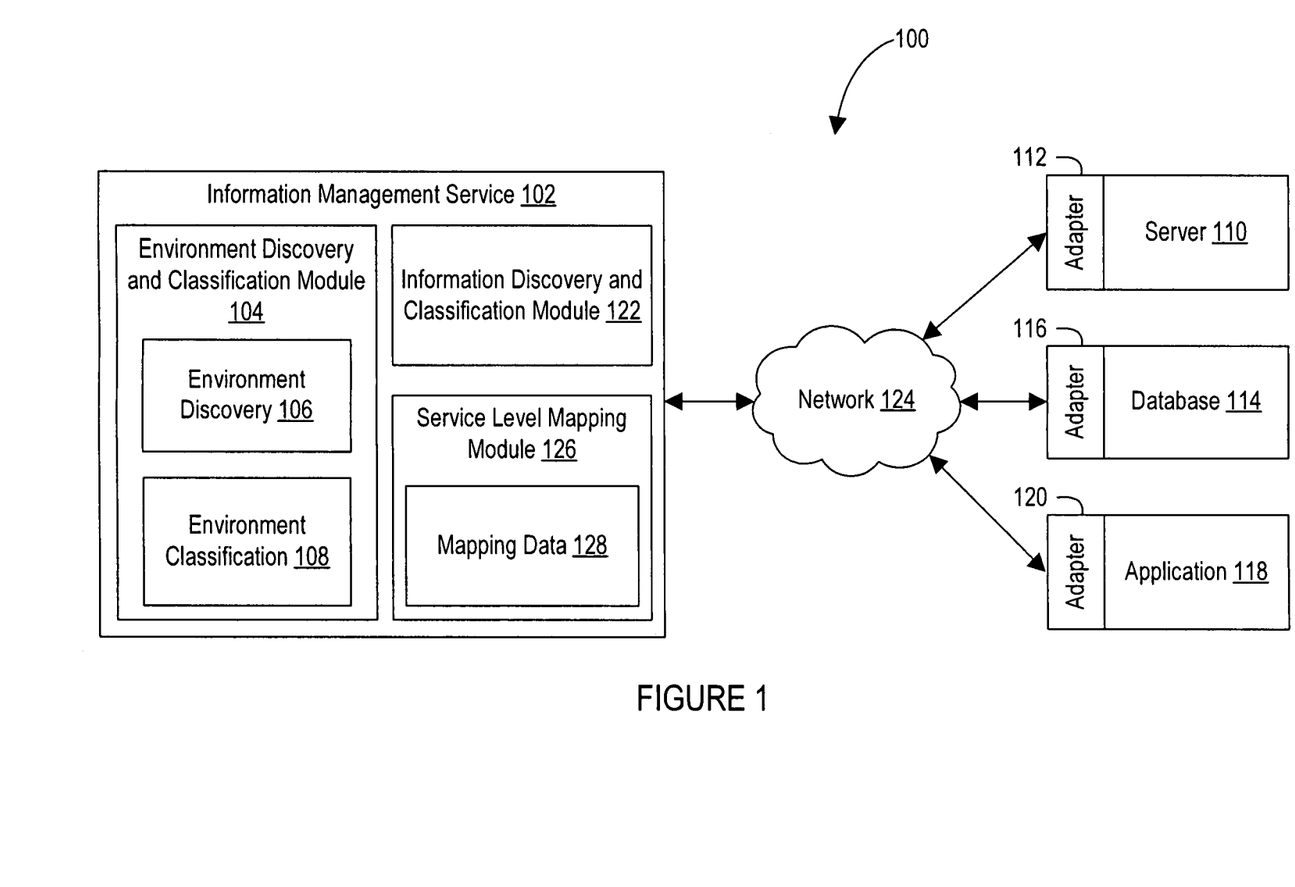
FIG. 1 illustrates a computer system having an information management service configured for classifying the environment components of the computer system, in accordance with the present invention.

Referring to FIG. 1, a computer system 100 is illustrated having various environment components, including a server 110, a database 114, and an application 118. The computer system 100 may include a single computer, a local area network (LAN), metropolitan area networks (MAN), a wide area network (WAN), and the like and combinations thereof. The environment components 110, 114 and 118 and the information management service 102 may be located a locally or at a remote location in relation to the clients utilizing the information management service 102.

An information management service 102 may be configured to provide various services, including but not limited to, an information discovery and classification module 122, an environment discovery and classification module 104, a service level mapping module 126, and the like. The information residing in the computer system 100 is discovered and classified by the information discovery and classification module 122. The environment components 110, 114 and 118 that exist within the computer system 100 are discovered and classified by the environment discovery and classification module 104. The service level mapping module 126 is then used for matching the discovered data objects to their service needs, and for the matching their service needs to the appropriate service provider (i.e., environment component) that is capable of providing those needs. Each of the modules 104, 122 and 126 will be described in further detail below, with particular emphasis placed on the service level mapping module 126.

As described previously, the environment discovery and classification module 104 is provided for discovering and for classifying the environment components 110, 114, and 118 that exist within the computer system 100. Although only three environment components are illustrated in FIG. 1, more or less environment components may exist within the computer system 100.

The environment components 110, 114, and 118 may provide a variety of services to the computer system 100 and to the data residing therein. For example, the server 110 may act as a storage server, retention server, data migration server, backup server, recovery server, data protection server, and the like or any combination thereof. The database 114, for example, may act as an exchange database, a payroll database, and the like or any combination thereof. The application 118 may include, for example, a data indexer, a data miner, a data transport, a security application, and the like or any combination thereof.

a. Information Discovery and Classification

A large variety of data objects may be stored within the computer system 100. The data objects may be discovered by the information discovery and classification module 122. The discovered data objects may have a variety of service needs. The service level objectives requested by a data object may be characterized by set of a service areas and a set of service levels. Service areas include generalized areas of service that may be performed on a data object, including data protection (e.g., frequency of backup, redundancy of data, and the like), data retention, data security (e.g., encryption, access control, and the like), data migration, data indexing, and the like. Service levels define the extent at which a service area is provided to the data object. For example, a service area may include data backup. Data backup may include various service levels, including an hourly backup, a daily backup, a weekly backup, a monthly backup, and the like.

The services required by each of the data objects may be imposed by the system administrator, governmental standards and regulations, company guidelines, and the like or any combination thereof. A single data object typically requires multiple services from more than one service area. The combination of services requested by a single data object is referred to herein as a "target service package."

A large computer system, such as an enterprise network, may include a large variety of data objects having various unique properties. Consequently, the data objects within a computer system may also request many different service level objectives. By way of example, certain data objects must be retained for one year, while other types of data objects must be retained indefinitely. Likewise, certain data objects must be indexed, while indexing is not necessary or may be overly expensive or may waste valuable resources when performed for other types of data objects. In addition, certain data objects must be saved to a backup location at least once per day, while other types of data objects only need to be saved to the backup location once every week. Within a company or enterprise network, documents created by one division within the company may require a higher level of service than documents created by another division within the company. Furthermore, documents containing predefined words, phrases, or data patterns may require higher levels of service than other types of documents. Other examples of differing service areas and differing service levels required by data within the system will also be evident to one of ordinary skill in the art.

In order to efficiently determine the service level objectives of each data object residing in the computer system 100, the data objects may be classified using the information discovery and classification module 122. In general, the information discovery and classification module 122 may perform an automated classification process, which may classify the data objects in accordance with a predefined set of rules. The data objects may be classified based on a number of factors, including the content contained within each data object, the organization, group or individual that created the data object, the metadata associated with each data object, and the like and any combination thereof. The metadata may be used to determine the date of last use of the data object, owner of the data object, date of creation, file size, file type, disposition date, content of the object, and the like.

b. Environment Discovery and Classification

Environment components 110, 114, or 118 are often limited as to the service areas and service levels that they are capable of providing. For example, the server 110 may be capable of providing a low level of security services for certain data files that do not require a high level of security, but the server 110 may be incapable of providing high level security services to highly confidential files. Therefore, it may be advantageous to classify the environment components in accordance with the service areas and service levels that each environment component is capable of providing.

Classifying the environment of the computer system 100 may be performed by the environment discovery and classification module 104 as a two step process. First, the system environment is discovered, and second, the discovered environment components are classified in accordance with their service level capabilities. In general, the environment discovery module 106 may create a detailed diagram of each environment component 110, 114, 118 contained within the computer system 100, as well as the manner in which each environment component interfaces with the other environment components and subsystems within the computer system 100. In order to create a detailed diagram, the environment discovery module 104 may rely on adapters 112, 116, and 120 that are specifically configured to communicate with and gather information from specific environment components 110, 114, and 118, respectively.

In order to classify the environment components 110, 114 and 118, the environment classification module 108 first identifies the environment components compiled by the environment discovery module 106. The environment classification module 108 analyzes the system environment data 106 in order to identify the service level capabilities of the environment components 110, 114 and 118. As described previously, the service level capabilities include the service areas and service levels that each of the environment components 110, 114 and 118 is able to provide to the data objects and other environment components located within the computer system 100.

The environment classification module 108 can then classify the environment components based on their service level capabilities. For example, a first backup server may provide a particular class of information protection service, such as daily backups, and a second backup server may provide a different class of information protection service, such as continuous data protection (CDP).

In one embodiment, storage locations are classified based on the service levels that can be provided to the data objects stored at each of the storage locations. In some instances, the services that can be provided to data objects are location-dependant. In other words, the services that are available in a computer system can often only be performed if a data object is located at a specific location. For example, a distributed computer system may include three primary storage locations. The distributed computer system may further include a data indexer that is only capable of indexing data that is located on two of the three primary storage locations. Therefore, when the three primary storage locations are categorized, the categorization will be performed in accordance with whether the data objects stored at the primary storage locations can be indexed by the data indexer, among other factors.

In another embodiment, storage locations are classified based on the data protection services that the storage location requires in order to provide sufficient protection to the data objects it contains. For example, a first storage location containing data of high importance may be classified such that a snapshot engine will perform a snapshot backup of the storage location once every hour, while a second storage location containing data of low importance may be classified such that the snapshot engine will only perform a snapshot backup once every week.

In another embodiment, environment components are classified based on the locations within the computer system that the service applications are capable of providing services to.

2. Service Level Mapping

Once the system environment and the data objects residing in the system have been discovered and classified, the service level mapping module 126 can perform the tasks of selecting service level objectives for each data object and selecting service packages and service providers that are capable of providing the service level objectives.

Figure 2:
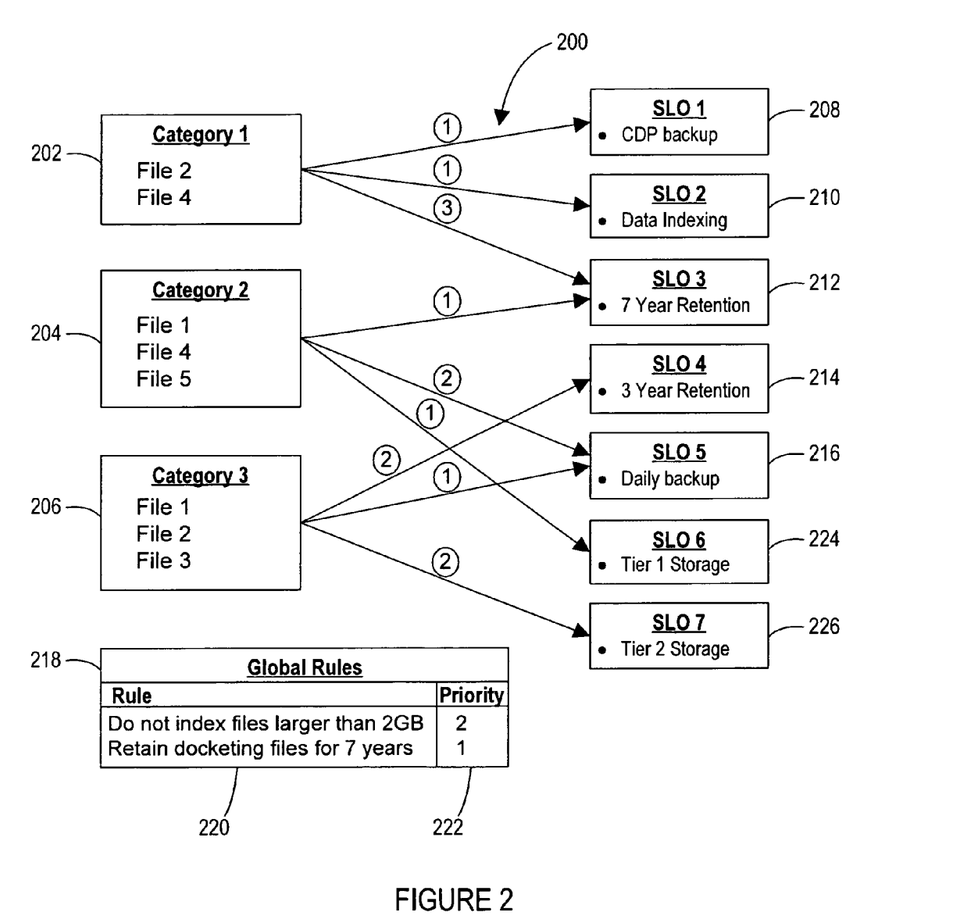
FIG. 2 illustrates an exemplary service level mapping of categories to service level objectives, in accordance with the present invention.

FIG. 2 provides an illustration of an exemplary service level mapping scheme 200 that may be employed by the service level mapping module 126 for matching each data object (i.e., Files 1-5) to the appropriate service level objectives (i.e., Service level objectives 1-7). As illustrated in FIG. 2, the files may be categorized into Categories 1-3 (202, 204 and 206), in accordance with properties associated with the files. By way of example, the first category 202 may include files that originated from a division within a company, such as accounting. The second category 204 may include files that exceed two gigabytes in size. The third category 206 may include files whose content includes private information, such as the social security numbers of customers of the company. The categorization of the files into the categories 202, 204 and 206 may be performed by the information discovery and classification module 122, as described previously.

A variety of different service level objectives may be offered to the files contained within the categories 202, 204 and 206. By way of example, the service level objectives that may be offered to the categories 202, 204 and 206 may include CDP backup 208, where every change to the data object is recorded in the CDP engine, data indexing 210, where the content of each file is indexed, seven year retention 212, where the data is stored for at least seven years prior to deletion, three year retention 214, where the data is stored for least three years prior to deletion, daily backup 216, where the files are stored to a backup location on a daily basis, tier 1 storage 224, tier 2 storage 226, and the like. As will be appreciated by one of ordinary skill in the art, many other service level objectives may be offered in addition to those illustrated in FIG. 2.

After assessing the categories 202, 204 and 206 and the available service level objectives 208, 210, 212, 214, 216, 224 and 226, the service level mapping module 126 maps each of the categories to one or more service level objectives for defining the types of services that will be requested by each category. The mappings are depicted by the arrows drawn from the categories 202, 204 and 206 to the service level objectives 208, 210, 212, 214, 216, 224 and 226. For example, Category 1 (202) is mapped to the CDP backup 208, data indexing 210 and seven year retention 212 service level objectives. Category 2 (204) is mapped to the seven year retention 212, daily backup 216 and tier 1 storage 224 service level objectives. Category 3 (206) is mapped to the three year retention 214, daily backup 216 and tier 2 storage 226 service level objectives. The generated service level mappings between the categories 202, 204 and 206 and the service level objectives 208, 210, 212, 214, 216, 224 and 226 may be stored, for example, in the form of metadata, in the mapping data structure 128.

As illustrated in FIG. 2, a single file may be included in multiple categories. For example, 'File 1' is included both in Category 2 (204) and in Category 3 (206). Therefore, 'File 1' will receive the services requested by both Category 2 (204) and by Category 3 (206). Because conflicts may arise when a file is included in multiple categories, the mappings from the categories to the service level objectives may be prioritized in order to resolve any conflicts that may arise, as is described in further detail below.

The creation of the service level mappings 200 can be done manually, by the user, or automatically through various programmatic methods, or some combination of manual and automatic methods. For example, in one embodiment, a user manually creates the service level mappings 200 for each category 202, 204 and 206 via a user interface by selecting from the service level objectives 208, 210, 212, 214, 216, 224 and 226 provided by the system. In another exemplary embodiment, a user may establish a rule set for defining service level objectives that will be assigned to particular files and categories having one or more categories. When new files are discovered and classified, as described previously, the rule set is automatically applied to the files and/or categories in order to generate the appropriate service level mappings.

In one embodiment, priorities may be assigned to each of the service level mappings between the categories 202, 204 and 206 and the service level objectives 208, 210, 212, 214, 216, 224 and 226. The priorities may be used in order to resolve any conflicts that may arise between the various service level objectives that may be requested by a single file. In the example illustrated in FIG. 2, the priority levels are positioned adjacent to the arrows representing the service level mappings from the categories 202, 204 and 206 to the service level objectives 208, 210, 212, 214, 216, 224 and 226.

One example service level conflict results in the service level mappings for the categories 204 and 206, which both contain 'File 1'. For example, the category 204 may include files that exceed two gigabytes in size, and the category 206 may include files whose content includes private information, such as the social security numbers of customers of the company, wherein 'File 1' falls within both of these categories. According to the service level mappings, files exceeding 2 GB in size (i.e., Category 204) should be retained for seven years, in accordance with service level 3 (212). However, files containing private information (i.e., Category 206) should only be retained for three years. In order to resolve this conflict, the priority levels of each service level mapping are compared with one another. Because the priority level of the service level mapping requesting seven year retention is a '1', the seven year retention service is deemed to have a "higher" priority than the three year retention service. Therefore, the service level mapping module 126 selects that 'File 1' be retained for seven years, in accordance with service level 3 (212).

In addition to assigning priority levels for the service level mappings between the categories 202, 204 and 206 and the service level objectives 208, 210, 212, 214, 216, 224 and 226, global rules 218 may also be provided and prioritized. Global rules may include, for example, rules that apply to all data objects regardless of which domain or line of business contains the data objects. For example, one of the rules 220 may include a stipulation that files larger than 2 GB should not be indexed due to the cost of the indexing large files. In order to ensure that this rule does not trump other service mappings that are of more important, it is assigned a low priority level 222 of '2'. Referring again to the above example, where the first category 202 includes files originating from accounting and second category 204 includes files that exceed two GB in size, a conflict arises when analyzing 'File 4.' As illustrated, 'File 4' exceeds 2 GB in size (category 204). Therefore, the global rule 220 that files larger than 2 GB in size should not be indexed applies to 'File 4'. However, 'File 4' also belongs to the accounting group (category 202), which includes a service level mapping to the service level 2 (210), which provides that the files included within the category 202 should be indexed. Because a conflict exists, the priority of the global rule 220 is compared to the priority of the service level mapping to the service level 210. Because the global rule 220 only has a priority level of '2', while the service level mapping to service level 210 as a priority of '1', the request that 'File 4' be indexed takes precedence over the global rule 220.

In some circumstances, a file may not be included within any category 202, 204 or 206, or may include insufficient properties to categorize or to map the file to a service level. In these situations, it may be necessary to infer the proper service level for the uncategorized file based on other factors. In one embodiment, where a file contains insufficient properties to properly perform service level mapping, the service level mapping module 126 determines the mapping for the file based on its associations with other files. For example, the service level mapping module 126 may identify where the uncategorized file is located. Then, the service level mapping module 126 identifies the other files stored at the same location and the services that the other files are mapped to. The uncategorized file may then be assigned to the same service level objectives that are associated with the other files that are stored at the same location, based on the presumption that many files sharing a common location may also share common attributes and service level needs. This embodiment is only one exemplary technique for inferring service level objectives for uncategorized data objects. As will be appreciated by one of ordinary skill in the art, other techniques may also be employed for assigning service level objectives to uncategorized data objects.

Figure 3:
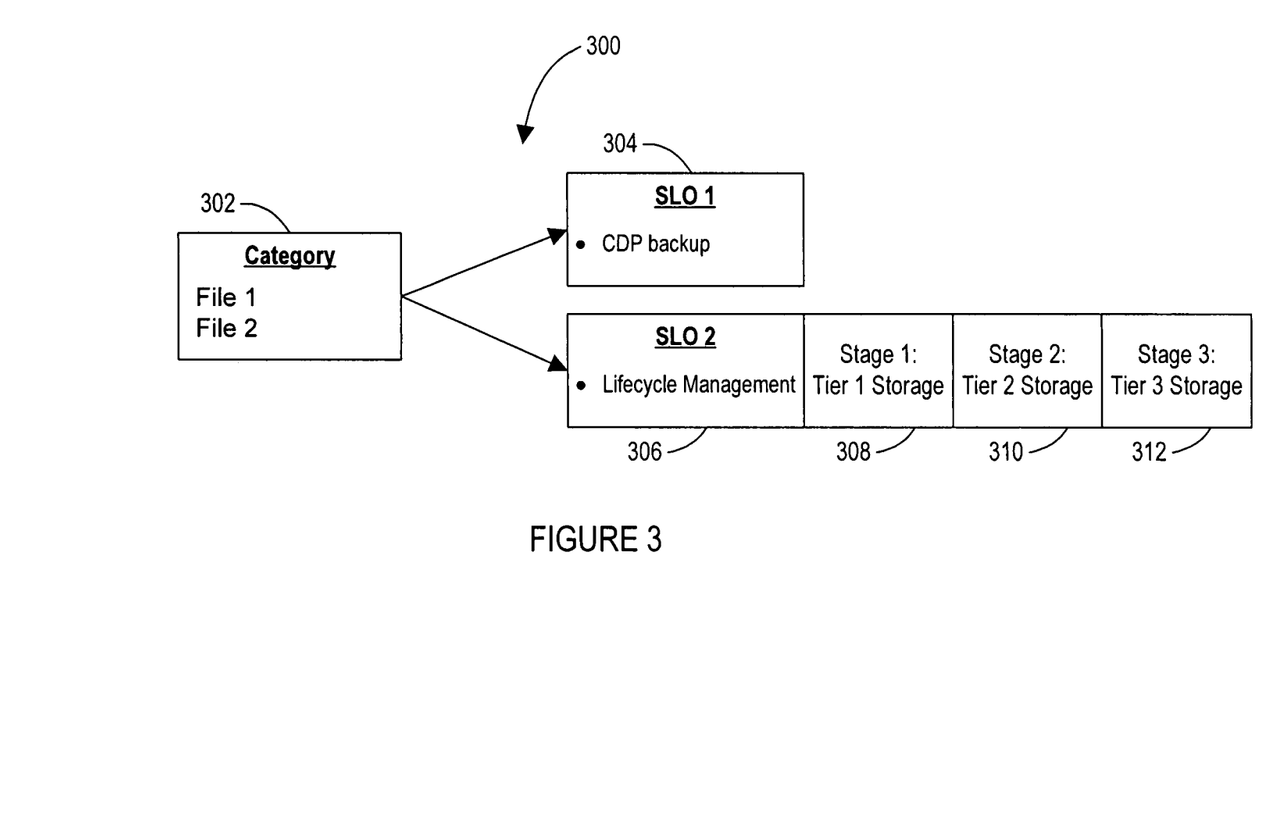
FIG. 3 illustrates an exemplary service level mapping where a category is mapped to a lifecycle management service, in accordance with the present invention.

FIG. 3 is another exemplary illustration of a service level mapping scheme 300 where the category 302 is mapped to a lifecycle management service level 306. The data object or category may be mapped to the lifecycle management service level 306 when the storage location of the data objects is dependent on aging properties associated with those data objects. When a data object or category is mapped to the lifecycle management service level 306, the aging properties of the data object are analyzed prior to selecting the actual service level that will be applied to the data objects. The aging properties that may be analyzed may include any property that may be relevant to the determination of the service level that should be applied to that file, including but not limited to, the amount of time since the data object was created, the amount of time since the data object was last accessed, the amount of time since the data object was last modified, the frequency at which the data object is accessed or modified, and the like and combinations thereof.

In the FIG. 3 example, the lifecycle management service level 306 will determine the storage location of the data objects included within the category 302 based on the aging properties of each of the files. For example, a file that was recently created and is often accessed or modified may be assigned to tier 1 storage 308, which may consist of a high-speed and reliable storage device. In contrast, the file that has not been accessed or modified for a long period of time may be assigned to tier 2 storage 310 or tier 3 storage 312, which may include slower storage devices that have lower redundancy and reliability than the tier 1 storage 308. By using lifecycle management to determine storage locations, the cost effectiveness of storage can be maximized by limiting the amount of expensive storage space that is occupied by low importance or seldom accessed files.

Figure 4:
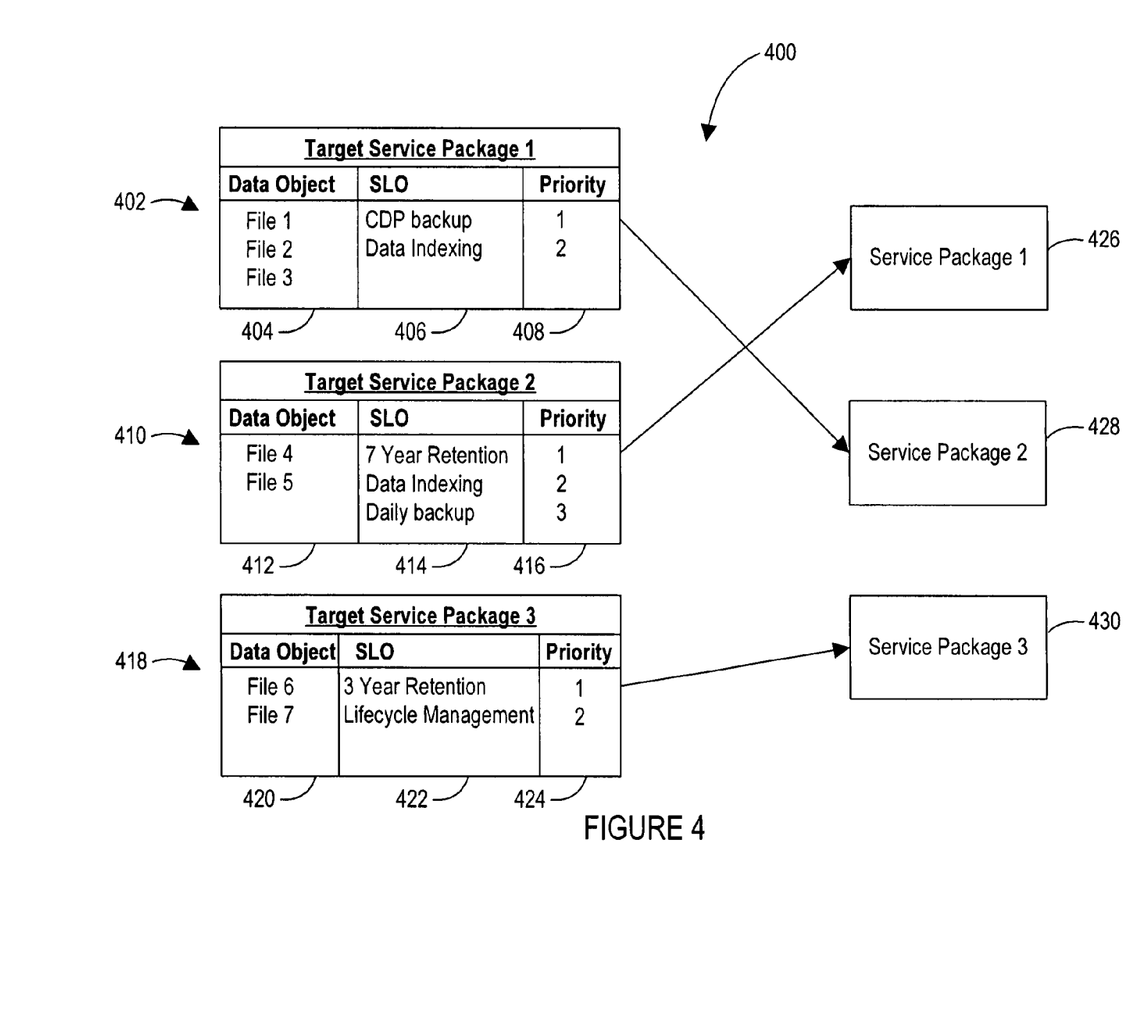
FIGS. 4 and 5 illustrate exemplary mappings of target service packages to the service packages offered by the data center that are most capable of providing the requested service level objectives, in accordance with the present invention.

After performing service level mapping to select the service level objectives for each category 202, 204 and 206, as illustrated in FIG. 2, the service level mapping module 126 maps each of the target service packages to one or more service packages offered by the data center that are most capable of providing the service level objectives contained in the target service packages, as illustrated in FIG. 4. FIG. 4 consists of "target service packages" 402, 410 and 418 on the left and "service packages" 426, 428 and 430 on the right. The "target service packages" 402, 410 and 418 consist of groups of files 404, 412, and 420 that have requests common service level objectives 406, 414 and 422. The "service packages" 426, 428 and 430 consist of the actual bundles of services that are offered by a data center. In some embodiments, some possible combinations of service level objectives may not correspond to a service package that the data center supports. FIG. 4 illustrates an exemplary mapping of the target service packages 402, 410 and 418 to a service provider 426, 428 and 430 that is most capable of providing the service level objectives 406, 414 and 422 contained within the target service packages.

Each target service package 402, 410 and 418 may be associated with multiple files, wherein all files contained within a single service package have requested the same group of service level objectives 406, 414 and 422. For example, the target service package 402 includes 'File 1', 'File 2' and 'File 3' (404), each of which has requested CDP backup and data indexing 406. The service level objectives 406, 414 and 422 included within each of the target service packages 402, 410 and 418, respectively, are provided by way of example, and do not necessarily reflect the service level mappings 200 illustrated in FIG. 2.

The service packages 426, 428 and 430 may include a bundle of services offered by one or more environment components to the data objects stored within the computer system. The number of service packages 426, 428 and 430 and the combination of services they each provide may be determined by a data center that specializes in information management services. The services contained in each of the service packages 426, 428 and 430 illustrated in FIG. 4 may be provided by multiple environment components that, taken together, are capable of providing all of the service is included within a service package.

The service level mapping module 126 maps each target service package 402, 410 and 418 to one or more service packages 426, 428 and 430 that are best able to provide the service level objectives 406, 414 and 422 of each of the service packages. In one embodiment, the service providers that provide the services offered in the service packages 426, 428 and 430 include environment components that have been classified in accordance with the environment classification techniques provided by the environment discovery and classification module 104 of FIG. 1. Because the service providers have been classified in accordance with their service level capabilities, and the files 404, 410 and 418 have been grouped according to their service level objectives 406, 414 and 422, the service level mapping module 126 can efficiently match the service needs of each target service package to the service bundle 426, 428 and 430 best capable of providing those needs.

In one embodiment, the service packages 426, 428 and 430 offered by the data center are sufficient in number to provide any combination of service level objectives 406, 414 and 422 that may exist. In this case, the step of mapping target service packages 402, 410 and 418 to the offered service packages 426, 428 and 430 may be unnecessary, and the target service packages may be mapped directly to the service providers capable of providing the necessary service level objectives 406, 414 and 422. However, in another embodiment, only a finite number of service packages 426, 428 and 430 are offered by the data center. Therefore, in some circumstances, the service packages 426, 428 and 430 offered by the data center may not be able to provide every combination of service level objectives 406, 414 and 422 contained in the target service packages 402, 410 and 418. In this embodiment, user configurable logic may be employed for determining which of the service level objectives 406, 414, and 422 to retain in the event that the data center has elected not to offer service bundles that exactly match the target service packages 402, 410 and 418.

For example, priority levels 408, 416 and 424 may be assigned to each of the service level objectives 406, 414 and 422, respectively. When no service package is available that it is capable providing all the service level objectives 406, 414 or 422 of a target service package 404, 410 or 418, the service package that is able to provide the service level objectives having the highest priority levels is identified. Alternatively, multiple service packages 426, 4428 and 430 may be identified, wherein the combination of the service packages is capable of providing the service level objectives having the highest priority levels.

By way of example, suppose that service package 1 (426) is capable of providing seven year retention and data indexing, while service package 2 (428) is capable of providing continuous data protection backup and daily backup services. Because service package 1 (426) is capable of providing the service level objectives having the highest two priority levels (i.e., seven year retention and data indexing) of target service package 2 (410), while the service package 2 (428) is only capable of providing the service level objective having the lowest priority level (i.e., daily backup), target service package 2 will be mapped to service package 1 (426) in order to meet its highest-priority needs. Likewise, because service package 2 (428) is capable of providing all of the service level objectives of target service package 1 (402), while service package 1 (426) is only capable of providing the service level objective having the lowest priority level (i.e., data indexing), target service package 1 (402) is mapped to service package 2 (428). The above scenario is merely provided by way of example. In some embodiments, a service level objective can be met regardless of which service package 426, 428 or 430 it is mapped to. For example, in one embodiment, data indexing can be delivered to any data object regardless of which service package it is mapped to and regardless of where the data object is stored.

Figure 5:
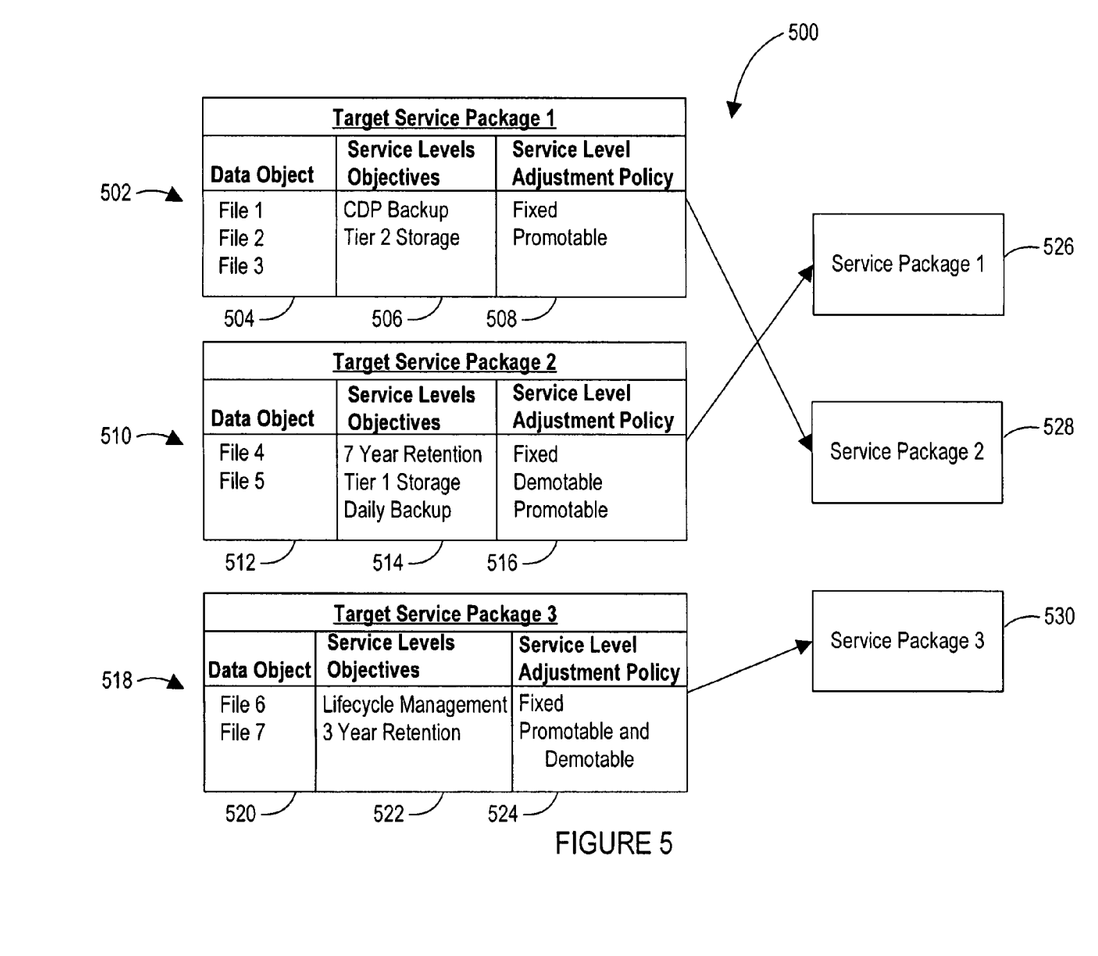

FIG. 5 illustrates another technique that may be employed for matching target service packages 502, 510 and 518 to service packages 526, 528 and 530 when a service package cannot be found that is capable of providing all the service level objectives 506, 514 and 522 of the target service packages. The FIG. 5 example uses service level adjustment policies 508, 516 and 524 to adapt the service level objectives 506, 514 and 522 in the event that the service packages 526, 528 and 530 are unable to provide all of the original service level objectives. By way of example, the service level adjustment policies 508, 516 and 524 may be selected from the following options: 1) a fixed option, wherein the service level objective cannot changed, or in other words, the service level objective must be provided regardless of whether the other service level objectives are met; 2) a promotable option, wherein the service level objective can be changed to a higher level if the requested service level objective is not available; and 3) a option, wherein the service level objective can be changed to a lower level if the requested service level objective is not available. If a requested service level objective is not particularly important, i.e., other service level objectives within the same service area may also suffice, options two and three may both be selected, such that the priority level may be promoted and demoted.

By way of example, the service level objectives 506 of target service package 1 (502) include CDP backup and tier 2 storage. The service level adjustment policies 508 associated with the service level objectives 506 include a 'fixed' requirement for CDP backup and a promotable option for the tier 2 storage service level objective. Therefore, if none of the service packages 526, 528 and 530 provide CDP backup and tier 2 storage, but service package 2 (528) provides CDP backup and tier 1 storage, the original request for tier 2 storage is promoted to tier 1 storage, and the target service package 1 (502) may be mapped to service package 2. As illustrated in the target service package 3 (518) service level adjustment policies 524, the '3 year retention' service level objective is both promotable and demotable. Therefore, by way of example, instead of requiring three year retention service, the data objects 520 within target service package 3 (518) may instead request one year retention or seven year retention if three year retention is not provided in combination with the other service level objectives 522.

Figure 6:
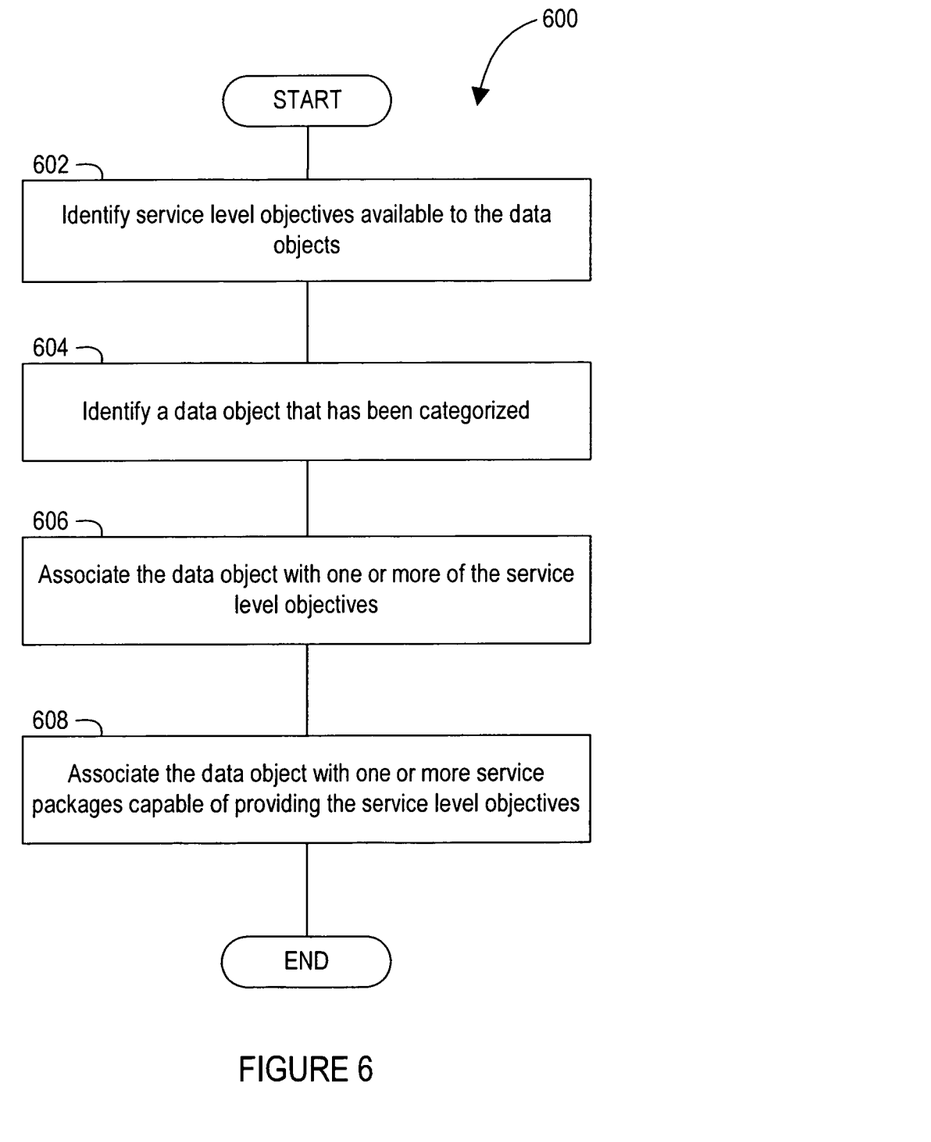
FIG. 6 illustrates a flow diagram of a method for assigning service level objectives to data objects, in accordance with the present invention.

FIG. 6 illustrates one embodiment of a method 600 of assigning service level objectives to data objects stored within a computer system. The method 600 may be practiced, for example, in a computer system that includes an information management server for providing customized services to the data objects residing therein. The server system may include one or more computer-readable media having computer-executable instructions, that when executed, implement the method 600. The method 600 identifies 602 at least one service level objective that defines a service that is available to the data objects stored in the computer system. For example, as illustrated in FIG. 2, various service level objectives 208, 210, 212, 214, 216, 224 and 226 may be available for providing services to the data objects.

Referring once again to FIG. 6, the method 600 identifies 604 a data object that has been categorized according to at least one property associated with the data object. Referring once again to FIG. 2, an illustrative example of a service level mapping scheme is provided. The Files 1-5 (i.e., data objects), have been categorized into the categories 202, 204 and 206 in accordance with properties associated with each of the files.

The data object is then associated 606 with one or more of the service level objectives for requesting that the services associated with the service level objectives be provided to the data object. Thus, as illustrated in the FIG. 2 example, associating the data objects to the appropriate service level objectives may include performing service level mappings between the categories 202, 204 and 206 and the service level objectives 208, 210, 212, 214, 216, 224 and 226.

In another embodiment, the method 600 may also include assigning a priority level to each of the service level objectives that the data object is associated with. The priority level will determine which of the service level objectives is retained in the event that conflicting service level objectives have been selected for a data object.

In one embodiment, the method may also include steps for handling data objects that have insufficient properties to be categorized or associated with an information management level. Once it is determined that a data object does not contain insufficient properties to be categorized, the storage location containing the data object is identified. Then, the information management levels that are associated with a substantial portion of the other data objects located within the same storage location are identified. Finally, the uncategorized data object is associated with the information management levels that are associated with the other data objects located within the storage location.

In one embodiment, the method may further include identifying 608 a service provider and/or service package that is capable of providing at least one of the service level objectives associated with the data object. Once the appropriate service provider and/or service bundle is identified, the data object is associated with the identified service provider.

In one embodiment, the data object is associated with a lifecycle service level objective. In this situation, the method may further include identifying aging characteristics of the data object based on access patterns of the data object, such as the amount of time since the data object was created, the amount of time since the data object was last accessed, the amount of time since the data object was last modified, the frequency at which the data object is accessed or modified, and the like and combinations thereof. Then, the data object is associated with the service level objective that is designated for providing services to data objects having the aging characteristics of the data object.

Figure 7:
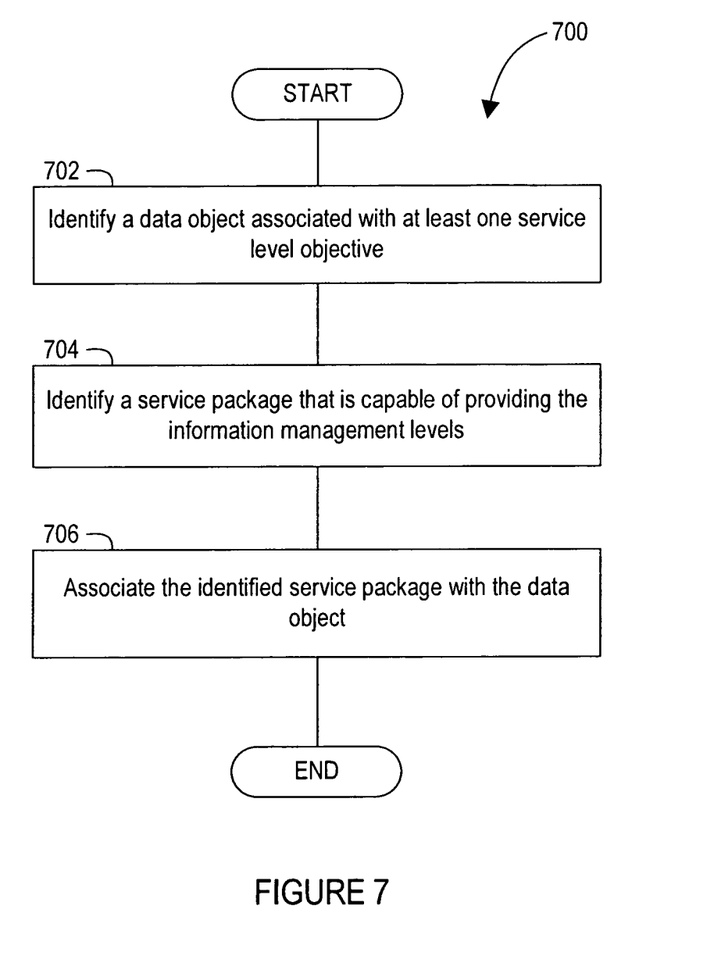
FIG. 7 illustrates a flow diagram of a method for assigning data objects to service providers capable of providing the service level objectives requested by the data objects, in accordance with the present invention.

Referring now to FIG. 7, a method 700 is illustrated of assigning data objects to service providers for providing requested service level objectives to the data objects. The method 700 may be practiced, for example, in a computer system that includes an information management server for providing customized services to the data objects residing in the computer system. The server system may include one or more computer-readable media having computer-executable instructions, that when executed, implement the method 700.

The method 700 identifies 702 a data object associated with at least one service level objective. The method 700 also identifies 704 a service package that is capable of providing at least one of the service level objectives associated with the data object. The identified service package is then associated 706 with the data object.

As described previously, a priority level may be assigned to each of the service level objectives that the data object is associated with. In one embodiment, identifying 704 the service package may further include identifying a service package that is capable of providing the service level objectives having the highest priority levels.

In another embodiment, each of the service level objectives associated with a data object is assigned an adjustment policy. The adjustment policy defines the adaptability of the service level objectives in the event that the service package is unable to provide all of the service level objectives. By way of example, the adjustment policy may be selected from the following options: 1) a fixed option; 2) a promotable option; and 3) a demotable option, as described in reference to FIG. 5.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system that includes an information management server for providing services to data objects residing in the computer system, a method for providing the services to the data objects, the method comprising an information management server performing:

identifying services that are available in the computer system and that can be provided to the data objects in the computer system;

identifying service level objectives, wherein each service level objectives is associated with at least one of the services;

identifying a data object that has been categorized based upon an intrinsic property of the data object, wherein the data object has been categorized into one or more categories;

categorizing each of the data objects into one or more categories;

mapping the data object to one or more of the service level objectives, wherein the data object is mapped based on the one or more categories of the data object and based on global rules that apply to all of the data objects, wherein mapping the data objects to the service level objectives customizes the services for the data object;

determining a target service package for the data object based on the service level objectives mapped to the data object, wherein the target service package includes a list of services;

mapping the target service package to a service package that is capable of providing at least one of the services associated with the target service package ; and providing the services included in the identified service package to the data object, wherein other data objects receive services in the same service package or in other service packages based on how the other data objects are mapped to the service level objectives.

2. The method as recited in claim 1, further comprising:
assigning a priority level to each of the mappings, wherein a mapping having a higher priority level is retained in an event that it conflicts with a mapping having a lower priority level.

3. The method as recited in claim 1, wherein:
identifying the data object that has been categorized according to at least one intrinsic property of the data object further comprises identifying a category containing a plurality of data objects that have been categorized according to the at least one intrinsic property of the plurality of data objects; and mapping the data object with one or more of the service level objectives further comprises mapping the category with the one or more service level objectives for requesting that the services associated with the one or more service level objectives be provided to the plurality of data objects contained within the category.

4. The method as recited in claim 1, further comprising:
identifying that the data object contained insufficient properties to be categorized;

identifying a storage location wherein the data object is located;

identifying which of the at least one service level objectives are associated with a substantial portion of other data objects located within the storage location; and associating the data object with the service level objectives that are associated with the substantial portion of the other data objects located within the storage location.

5. The method as recited in claim 1, wherein the data object is associated with a lifecycle service level objective, the method further comprising:

identifying aging characteristics of the data object based on access patterns of the data object; and associating the data object with the service level objective that is designated for providing services to data objects having the identified aging characteristics.

6. In a computer system that includes an information management server for providing services to data objects residing in the computer system, a method for assigning the data objects to service providers in order to customize the services provided to the data objects, the method comprising an information management server performing:

identifying services that are available in the computer system and that can be provided to the data objects in the computer system;

identifying service level objectives, wherein each service level objectives is associated with at least one of the services;

identifying a data object associated with at least one service level objective, each service level objective associated with the data object is mapped to the data object based on a category assigned to the data object, the category having been assigned to the data object based on one or more intrinsic properties of the data object;

determining a target service package based on the at least one service level objective mapped to the data object and based on global rules that apply to more than one of the data objects, wherein the target service package includes a list of services;

identifying a service package that is capable of providing at least one of the services identified in the target service package; and associating the identified service package with the data object, wherein services included in the identified service package are provided to the data object, wherein other data objects are associated with the same service package or with other service packages such that each data object receives services that are customized based on the how the other data objects are mapped to the service level objectives.

7. A method as recited in claim 6, further comprising:
providing the user, via a user interface, with a finite number of selectable service packages, each service package containing a plurality of service levels.

8. A method as recited in claim 6, further comprising:
assigning a priority level to each of the one or more service level objectives that the data object is associated with; and
wherein identifying a service package that is capable of providing at least one of the service level objectives associated with the data object further comprises:
identifying a service package that is capable of providing the service level objectives having the highest priority levels.

9. A method as recited in claim 6, further comprising:
assigning each of the service level objectives associated with the data object priority levels an adjustment policy for defining the adaptability of the service level objectives in the event that the service package is unable to provide all of the service level objectives associated with the data object, the adjustment policy being selected from:
a non-adjustable option, wherein the service level objective will not be changed;
a promotable option, wherein the service level objective can be changed to a higher service level objective; and
a demotable option, wherein the service level objective can be changed to a lower service level objective.

10. A method as recited in claim 6, wherein:
identifying a data object associated with at least one service level objective further comprises identifying a target service package containing a plurality of data objects that are associated with the at least one service level objective; and
associating the identified service package with the data object further comprises associating the identified service package with the identified target service package.

11. A method as recited in claim 6, further comprising:
flagging the data object in the event that no service package is capable of adequately providing the at least one service level objective associated with the data object.

12. A method as recited in claim 6, wherein the service package consists of at least one service level that is provided by at least one service provider.

13. The method as recited in claim 12, wherein associating the identified service package with the data object further comprises associating the at least one service provider with the data object.

14. The method as recited in claim 12, wherein the service providers include at least one of file servers, retention servers, backup servers, databases, and applications.

15. A computer program product for use in a computer system that includes an information management server for providing customized services to data objects residing in the computer system, the computer program product used in implementing a method of providing the customized services by assigning service level objectives to the data objects, the computer program product comprising one or more non-transitory computer readable storage media having stored thereon computer executable instructions that, when executed by one or more processors, cause the computing system to perform the following:
identify services that are available in the computer system and that can be provided to the data objects in the computer system;
identify service level objectives, wherein each service level objectives is associated with at least one of the services;
identify a data object that has been categorized based upon at least one intrinsic property of the data object, wherein the data object has been categorized into one or more categories using metadata collected from and generated from the data object;
map the data object to one or more of the service level objectives based on the one or more categories assigned to the data object and based on global rules that apply to more than one of the data objects, the one or more service level objectives identifying services for the data object, wherein mapping the data object to the one or more service level objectives customizes the services for the data object;
determine a target service package for the data object based on the one or more service level objectives, the target service package including a list of services;
identify a service package that is capable of providing at least some of the services in the list of services from the target service package; and
provide the services in the service package to the data object.

16. The computer program product as recited in claim 15, wherein the computer executable instructions, when executed by the one or more processors, additionally cause the computing system to perform the following:
assign a priority level to each of the one or more service level objectives that the data object is associated with, wherein the service level objectives of a higher priority level are retained in an event that they conflict with the service level objective of a lower priority level.

17. The computer program product as recited in claim 15, the computer program product further including instructions configured to:
identify a service provider that is capable of providing at least one of the service level objectives associated with the data object; and
associate the identified service provider with the data object.

18. The computer program product as recited in claim 15, wherein the data object is associated with a lifecycle service level objective, the computer program product further including instructions configured to:
identify aging characteristics of the data object based on access patterns of the data object; and
associate the data object with the service level objective that is designated for providing services to data objects having the identified aging characteristics.

19. The method as recited in claim 1, wherein the identified service package includes fewer services than those of the target service package.

20. The method as recited in claim 19, further comprising using a service level adjustment policy to adapt the service level objectives when the service package is unable to provide all the services of the target service package.

21. The method as recited in claim 6, wherein identifying a service package that is capable of providing at least one of the services identified in the target service package comprises identifying a service package that is most capable of providing the services identified in the target service package.

22. The method as recited in claim 1, wherein the service for the data object identified by the service level objective comprises one of backup of the data object, indexing of the data object, retention of the data object for a predetermined time period, and storage of the data object.

23. The method as recited in claim 1, wherein the intrinsic property of the data object upon which the categorization of the data object is based comprises one or more of the content of the data object, the organization, group or individual that created the data object, and metadata of the data object, and any combination of one or more of the foregoing.

24. The method as recited in claim 23, further comprising using the metadata of the object to determine one or more intrinsic properties of the data object, wherein the one or more intrinsic properties include a date of last use of the data object, an owner of the data object, a date of creation of the data object, a file size of the data object, a file type of the data object, a disposition date of the data object, content of the data object, and any combination of one or more of the foregoing.

* * * * *